US008980447B2

(12) United States Patent
Uchida

(10) Patent No.: US 8,980,447 B2
(45) Date of Patent: Mar. 17, 2015

(54) MAGNETIC RECORDING MEDIUM HAVING A SOFT MAGNETIC UNDERLAYER WITH TAILORED RELATIVE PERMEABILITY REGIONS

(71) Applicant: Fuji Electric Co., Ltd., Kawasaki-shi (JP)

(72) Inventor: Shinji Uchida, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 14/365,345

(22) PCT Filed: Jun. 7, 2013

(86) PCT No.: PCT/JP2013/003623
§ 371 (c)(1),
(2) Date: Jun. 13, 2014

(87) PCT Pub. No.: WO2014/002406
PCT Pub. Date: Jan. 3, 2014

(65) Prior Publication Data
US 2014/0322561 A1    Oct. 30, 2014

(30) Foreign Application Priority Data
Jun. 27, 2012    (JP) .................................. 2012-144282

(51) Int. Cl.
*G11B 5/667*    (2006.01)
*G11B 5/82*    (2006.01)
(52) U.S. Cl.
CPC . *G11B 5/82* (2013.01); *G11B 5/667* (2013.01)
USPC ......................................... 428/827; 428/829

(58) Field of Classification Search
None
See application file for complete search history.

(56) References Cited

U.S. PATENT DOCUMENTS

| 4,967,184 | A | * | 10/1990 | Regelsberger | ............. 340/572.8 |
| 5,522,946 | A | | 6/1996 | Tomita et al. | |
| 2007/0217074 | A1 | * | 9/2007 | Zhou et al. | ..................... 360/135 |
| 2009/0116147 | A1 | * | 5/2009 | Choe | ............................ 360/135 |
| 2013/0052486 | A1 | * | 2/2013 | Uchida | ...................... 428/828.1 |

FOREIGN PATENT DOCUMENTS

| JP | 02018711 | A | * | 1/1990 |
| JP | H05-282647 | A | | 10/1993 |
| JP | H06-68461 | A | | 3/1994 |
| JP | 2000-268341 | A | | 9/2000 |
| JP | 2005-328046 | A | | 11/2005 |
| JP | 2008-071455 | A | | 3/2008 |

OTHER PUBLICATIONS

Derwent Abstract Translation of JP 02-018711 A (Derwent Acc-No. 1990-0642766, published 1990).*

* cited by examiner

*Primary Examiner* — Kevin Bernatz
(74) *Attorney, Agent, or Firm* — Rabin & Berdo, P.C.

(57) ABSTRACT

A magnetic recording medium is disclosed. The magnetic recording medium includes at least a disc-shaped non-magnetic substrate having a hole at a center, a soft magnetic underlying layer, and a magnetic recording layer. Relative permeability of the soft magnetic underlying layer under a magnetic field having one of the frequencies 100 MHz to 700 MHz increases gradually from a disc outer circumference to a disc inner circumference and a characteristic frequency of the relative permeability increases gradually from the disc inner circumference to the disc outer circumference.

7 Claims, 7 Drawing Sheets

(CONVENTIONAL ART)

MAGNETIC RECORDING MEDIUM HAVING A SOFT MAGNETIC UNDERLAYER WITH TAILORED RELATIVE PERMEABILITY REGIONS

TECHNICAL FIELD

The present invention relates a magnetic recording medium used in a magnetic recording device.

BACKGROUND ART

There is an increasing demand for further improving the performance such as recording capacity and processing speed of hard disk drive (HDD). Thus, it is necessary to further improve the recording density of magnetic recording media incorporated in the HDD. To meet such a demand, a perpendicular magnetic recording technique is employed as a recording technique of magnetic recording media. In a perpendicular magnetic recording technique, signals are recorded in a direction perpendicular to a principal plane of a magnetic recording medium. A magnetic recording medium used in the perpendicular magnetic recording technique includes, at least, a magnetic recording layer formed from a hard magnetic material having perpendicular magnetic anisotropy and a soft magnetic underlying layer (SUL) which performs a role of concentrating the magnetic flux generated by a single-pole head used for recording signals on a magnetic recording layer.

As illustrated in FIG. 3, a typical perpendicular magnetic recording system of the conventional art includes a magnetic recording medium 17 and a single-pole head 10. The single-pole head 10 includes a main pole 11, a return yoke 12, and a coil 13 surrounding the return yoke 12. A magnetic flux 14 generated from the main pole 11 passes through a magnetic recording layer 15 immediately below the main pole 11 and reaches the inside of an soft magnetic underlying layer 16. The magnetic flux then passes and spreads through the soft magnetic underlying layer 16 in an in-plane direction, passes through the magnetic recording layer 15 immediately below the return yoke 12, and returns to the return yoke 12. With this mechanism, a region of the magnetic recording layer 15 immediately below the main pole 11 is magnetized in a predetermined direction.

In recent years, there is a problem in that the signal-to-noise ratio (SNR) decreases when signals are recorded in high recording density. In general, the disk rotating speed of a magnetic recording medium is constant regardless of recording density. Thus, in order to record signals in high density, it is necessary to write signals at higher frequencies. The problem of decrease in SNR results from the inability of the magnetization response characteristics of the soft magnetic underlying layer to follow the increase in the frequency accompanied by the high recording density.

Further, in a ring-shaped magnetic recording medium used in the HDD, signals on the disc outer circumference side are recorded at higher linear velocity than on the inner circumference side close to the center of the disc. Due to this, in HDDs, a plurality of zones is set so as to be arranged from the inner circumference side of the magnetic recording medium to the outer circumference side, and bit pitches are equalized by changing the recording frequency in the respective zones. As a result, in the magnetic recording medium, the recording frequency on the outer circumference side is higher than the recording frequency on the inner circumference side.

In general, a magnetic material having high relative permeability has a low characteristic frequency, and the relative permeability under a recording magnetic field having high frequencies decreases, which results in a large loss. Conversely, a magnetic material that has a high characteristic frequency and satisfies high-frequency characteristics has low relative permeability. Due to this, in a magnetic recording medium, in order to cope with the high recording frequency on the outer circumference side, it is necessary to use a magnetic material having a relatively low relative permeability.

In the present specification, "characteristic frequency of relative permeability" is often referred to simply as "characteristic frequency." In the present specification, the expression "characteristic frequency" means a frequency at which when the frequency of a magnetic field is increased, the relative permeability of a magnetic material decreases by a predetermined amount as compared to the relative permeability of the magnetic material under a magnetic field having a reference frequency.

With regard to this problem, Japanese Patent Application Publication No. H5-282647 and Japanese Patent Application Publication No. 2000-268341 disclose a magnetic recording medium in which a soft magnetic oxide represented by ferrite is used as a magnetic material that forms a soft magnetic underlying layer to reduce loss based on eddy current under a high-frequency recording magnetic field to thereby improve magnetization response characteristics and to provide excellent recording performance in high recording density (see Japanese Patent Application Publication No. H5-282647 and Japanese Patent Application Publication No. 2000-268341).

Moreover, Japanese Patent Application Publication No. 2005-328046 discloses, as a material capable of satisfying both high-frequency characteristics and high saturation magnetization, a magnetic thin film that microscopically includes a first ferromagnetic amorphous phase containing Fe and Co and a second amorphous phase containing boron (B) and carbon (C), although this magnetic thin film is not applied to magnetic recording media (see Japanese Patent Application Publication No. 2005-328046).

DISCLOSURE OF THE INVENTION

The soft magnetic oxide represented by ferrite disclosed in Japanese Patent Application Publication No. H5-282647 and Japanese Patent Application Publication No. 2000-268341 has low saturation magnetization. Thus, in order to allow the magnetic flux of the single-pole head to pass through the material, the material needs to have a large thickness, and it is difficult to use the material as it is as a soft magnetic underlying layer of a perpendicular magnetic recording medium.

Studies have been conducted to use the magnetic material disclosed in Japanese Patent Application Publication No. 2005-328046 in a soft magnetic underlying layer by adjusting the magnetic material so as to be adapted to the recording frequency in a middle circumference (radius value R=22.5 mm) of a 2.5-inch disc. In this case, satisfactory SNR and EWAC characteristics were obtained in a region (radius value R is between 11 mm and 22.5 mm) extending from the inner circumference of the magnetic recording medium to the middle circumference. The EWAC characteristics represent the degree of write spreading to adjacent tracks including oblique magnetization and are an important evaluation index together with SNR. Specifically, the magnetic flux from the single-pole head is ideally perpendicular to the surface of the magnetic recording layer. However, practically, the magnetic flux from the tip end of the single-pole head reaches the soft magnetic underlying layer while spreading obliquely. Due to this, with spreading of the magnetic flux, write spreading occurs in a cross-track direction (radial direction of a circular ring). The index indicating the degree of write spreading is EWAC characteristics. Moreover, the EWAC characteristics are characteristics which represent a decrease in the output due to writing of signals having low frequencies (long periods) to adjacent tracks and which do not rarely matter when recording high-frequency (short period) signals. Thus, the problem associated with the EWAC characteristics is likely to occur in the inner circumference portion in which the recording frequency is low. Due to this, the requirement for the EWAC characteristics is often looser in the outer circumference portion than in the inner circumference portion.

However, in the soft magnetic underlying layer, SNR deteriorates greatly in a region (radius value R is larger than 22.0 mm and 31.5 mm or smaller) extending from the middle circumference to the outer circumference. When the magnetic material adapted to the recording frequency in the outer circumference was used in the soft magnetic underlying layer, the EWAC characteristics were deteriorated in the region extending from the inner circumference of the magnetic recording medium to the middle circumference. A 2.5-inch disc has a disc shape (so-called a ring shape) with a hole at the center, having an outer diameter (radius of 32.5 mm) of 65 mm, an inner diameter (radius of 10 mm) of 20 mm, and a thickness of approximately 0.5 mm to 1.5 mm.

As described above, in the conventional soft magnetic underlying layer that is uniform within the plane, it is necessary to select a magnetic material having a low relative permeability in order to cope with the highest recording frequency on the outer circumference side of the magnetic recording medium. Thus, the obtained magnetic recording medium has low EWAC characteristics in the region extending from the middle circumference to the inner circumference. The same problem occurs in a 3.5-inch disc having an outer diameter of 95 mm and an inner diameter of 25 mm.

To solve the problems, an object of the present invention is to provide a magnetic recording medium that has excellent SNR and EWAC characteristics over the entire surface range from an inner circumference to an outer circumference and is capable of coping with an improvement in recording density.

The present invention has been made to attain the object, which are solved by the means described below.

A magnetic recording medium of the present invention includes, at least: a disc-shaped non-magnetic substrate having a hole at a center; a soft magnetic underlying layer; and a magnetic recording layer, wherein relative permeability of the soft magnetic underlying layer under a magnetic field having one of frequencies 100 MHz to 700 MHz increases gradually from a disc outer circumference to a disc inner circumference and a characteristic frequency of the relative permeability increases gradually from the disc inner circumference to the disc outer circumference.

The expression "relative permeability" means a value obtained by dividing permeability by space permeability $\mu_0$. The space permeability $\mu_0$ is $4\pi \times 10^{-7}$ [H/m]. In the present invention, the characteristic frequency of relative permeability means the frequency of a magnetic field at which the relative permeability is 50% of the value of the relative permeability under a magnetic field having the frequency 10 MHz.

Preferably, the soft magnetic underlying layer is formed of a plurality of regions arranged in order from the disc inner circumference to the disc outer circumference, the plurality of regions includes a disc inner circumference portion which is an innermost circumference region and a disc outer circumference portion which is an outermost circumference region, the characteristic frequency of the relative permeability increases stepwise from the disc inner circumference to the disc outer circumference, and the relative permeability increases stepwise from the disc outer circumference to the disc inner circumference. More preferably, the soft magnetic underlying layer is formed of two regions in the disc inner circumference portion and the disc outer circumference portion. Here, under a magnetic field having the frequency used in the disc inner circumference portion, the soft magnetic underlying layer in the disc inner circumference portion preferably has higher relative permeability than the soft magnetic underlying layer in the disc outer circumference portion. Further, preferably, the characteristic frequency of the relative permeability of the soft magnetic underlying layer in the disc outer circumference portion is 1000 MHz or higher, the relative permeability of the soft magnetic underlying layer in the disc inner circumference portion under a magnetic field having a frequency of 300 MHz is 280 or higher, and the relative permeability of the soft magnetic underlying layer in the disc outer circumference portion under a magnetic field having a frequency of 900 MHz is 140 or higher.

Moreover, the soft magnetic underlying layer contains (i) a ferromagnetic material containing Fe and Co and (ii) an added material containing at least one element selected from the group consisting of B, C, Ti, Zr, Hf, V, Nb, and Ta, and a proportion of the ferromagnetic material increases gradually from the disc outer circumference to the disc inner circumference. The ferromagnetic material may include a ferrimagnetic material. Further, preferably, the soft magnetic underlying layer in the disc inner circumference portion contains a ferromagnetic material that is between 81 vol % and 84 vol % of a total volume of the ferromagnetic material and the added material, and the soft magnetic underlying layer in the disc outer circumference portion contains a ferromagnetic material that is between 80 vol % and 82 vol % of a total volume of the ferromagnetic material and the added material.

According to the present invention, it is possible to provide a magnetic recording medium capable of satisfying the requirements for both SNR and EWAC characteristics and coping with improvements in recording density.

BEST MODE FOR CARRYING OUT THE INVENTION

Figure 1:
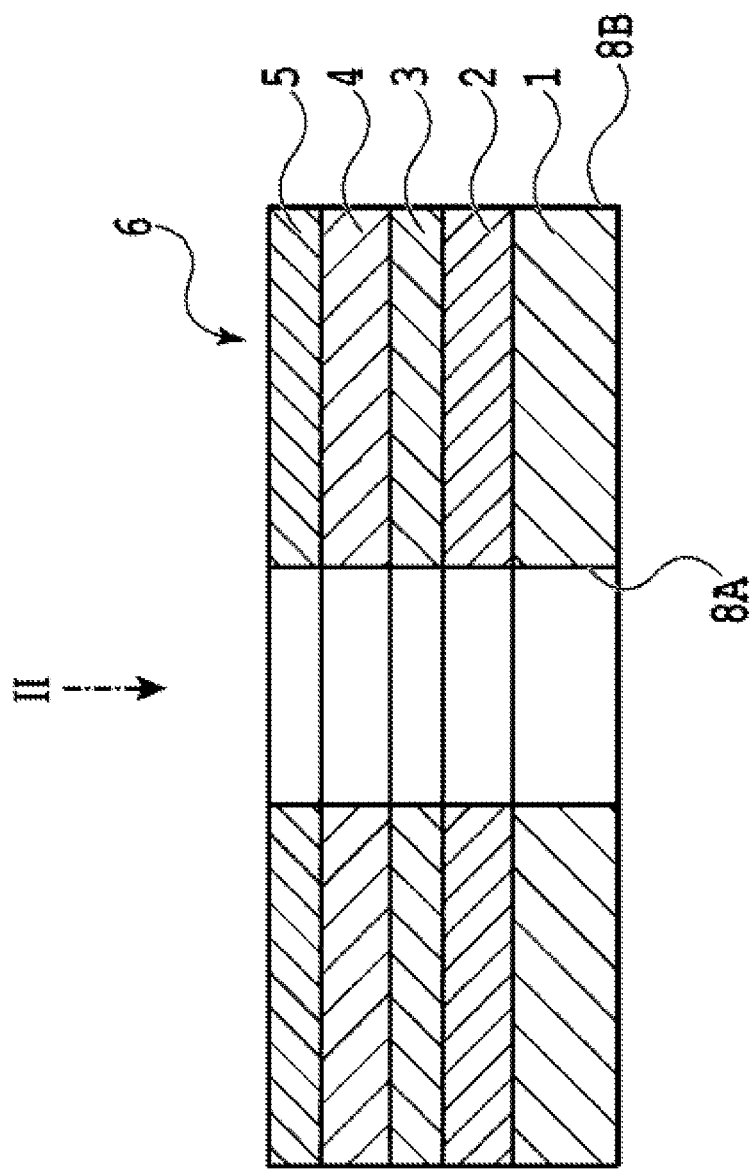
FIG. 1 is a cross-sectional schematic view illustrating a configuration of a perpendicular magnetic recording medium according to the present invention.

First, the present inventor has manufactured a magnetic recording medium including a soft magnetic underlying layer in which a material containing one or a combination of elements B, C, Ti, Zr, Hf, V, Nb, and Ta was added as an added material to a ferromagnetic material containing Fe and Co, and has intensively studied the read/write characteristics (SNR and EWAC characteristics) thereof. The ferromagnetic material includes a ferrimagnetic material. Moreover, the present inventor has manufactured a magnetic recording medium including a soft magnetic underlying layer consisting of a ferromagnetic material including Fe and Co as a reference sample and has compared this magnetic recording medium with the magnetic recording medium that includes a soft magnetic underlying layer including a soft magnetic layer in which an added material was added. As a result, it was found that the soft magnetic underlying layer including the soft magnetic layer in which the added material was added provided an improvement in SNR of the magnetic recording medium during read/write of high-frequency signals with an increase in the proportion of the added material as compared to the reference sample. However, simultaneously, it was found that the oblique magnetization resistance (EWAC characteristics) of the magnetic recording medium decreases with an increase in the proportion of the added material.

It was thought that when the proportion of the added material increases, the characteristic frequency of the relative permeability of the soft magnetic underlying layer increases and the SNR of the magnetic recording medium during read/write of high-frequency signals improves. However, simultaneously, an increase in the proportion of the added material decreases the overall relative permeability of the soft magnetic underlying layer. Due to this, it was thought that the ability to pulling a magnetic flux toward the soft magnetic underlying layer decreases, the magnetic flux spreads from a head, and the EWAC characteristics of the magnetic recording medium deteriorate. As described above, in a magnetic recording medium that uses a soft magnetic underlying layer including a soft magnetic layer containing (i) a ferromagnetic material containing Fe and Co and (ii) an added material containing at least one element selected from the group consisting of B, C, Ti, Zr, Hf, V, Nb, and Ta, the EWAC characteristics in high-frequency recording and SNR in high-frequency read/write are in a trade-off relationship.

On the other hand, as described above, in a magnetic recording medium, higher frequency signals are recorded on the inner circumference side than on the outer circumference side. Thus, in order to satisfy the SNR and the EWAC characteristics on the entire surface of the magnetic recording medium, it is necessary to select a soft magnetic underlying layer applicable for recording on the outer circumference side where the highest frequency is used. As a result, it is necessary to select a soft magnetic underlying layer having low relative permeability and the overall EWAC characteristics decrease.

Based on the results above, the present inventors have intensively studied a magnetic recording medium having optimal SNR and EWAC characteristics on the entire surface thereof and capable of coping with an increase in recording density. As a result, it was possible to obtain the magnetic recording medium of the present invention.

Figure 2:
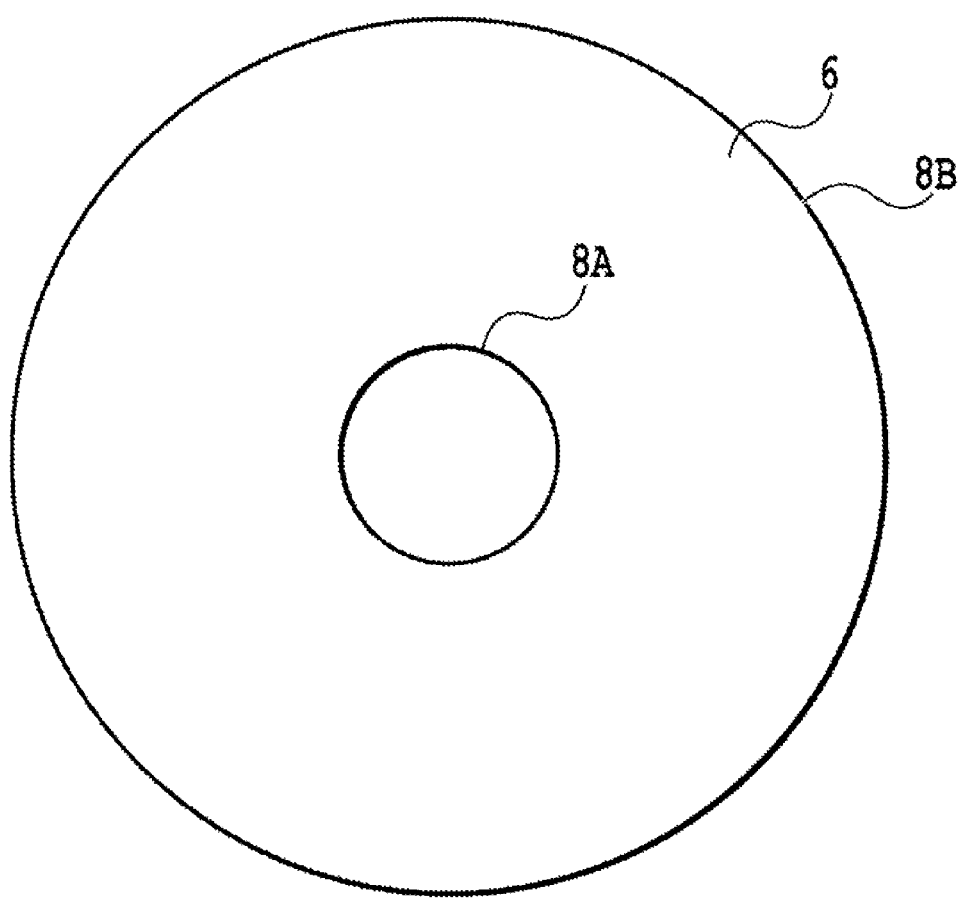
FIG. 2 is a schematic plan view illustrating a configuration of the perpendicular magnetic recording medium according to the present invention.
Figure 3:
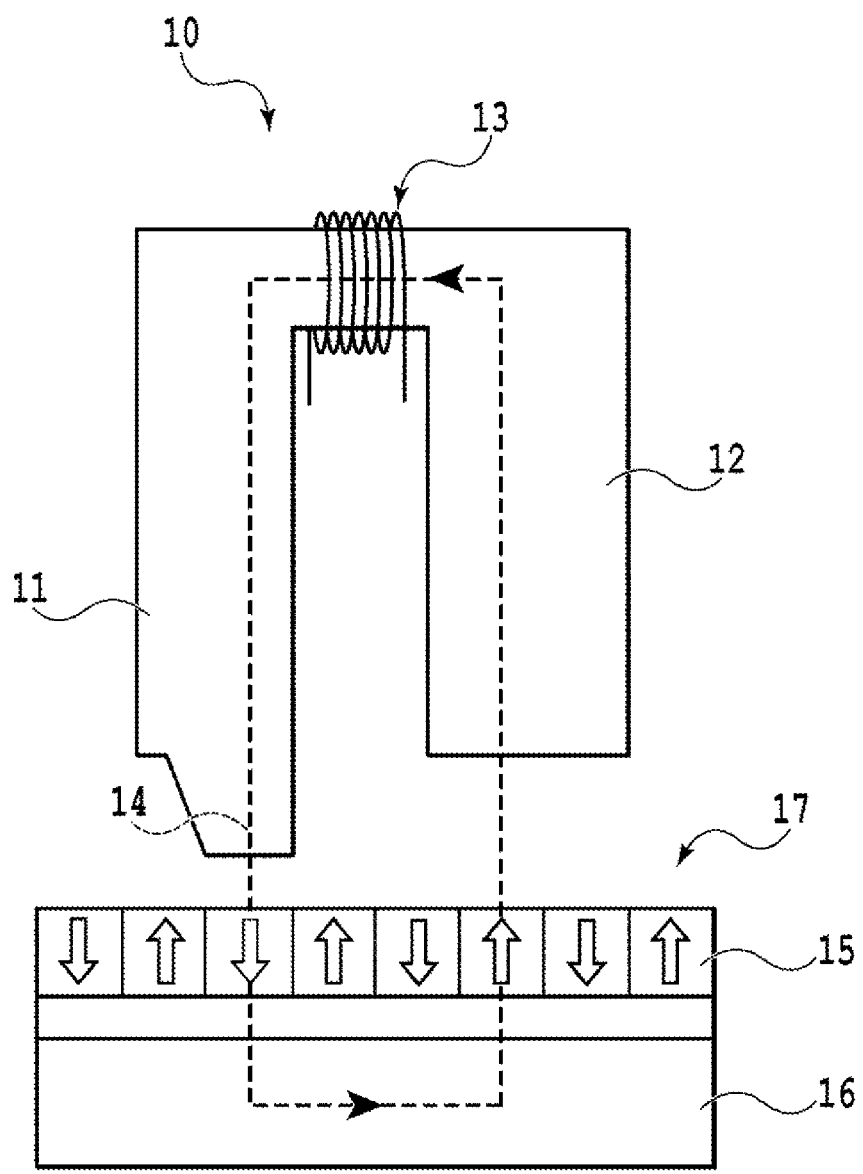
FIG. 3 is a schematic view illustrating a configuration of a typical perpendicular magnetic recording system according to a conventional art.

Hereinafter, an embodiment of a magnetic recording medium according to the present invention will be described based on FIGS. 1 and 2. FIG. 1 is a schematic cross-sectional view illustrating an example of a magnetic recording medium 6 according to the present invention. FIG. 2 is a schematic plan view illustrating the structure of the magnetic recording medium 6 according to the present invention when seen from the direction indicated by II in FIG. 1.

The magnetic recording medium 6 according to the present invention includes at least a non-magnetic substrate 1, a soft magnetic underlying layer 2, and a magnetic recording layer 4. The magnetic recording medium of the present invention may optionally further include an underlayer 3, a protective layer 5, and a lubricating layer (not illustrated). The magnetic recording medium of the present invention preferably has a structure in which the non-magnetic substrate 1, the soft magnetic underlying layer 2, the underlayer 3, the magnetic recording layer 4, the protective layer 5, and the lubricating layer are sequentially stacked. Moreover, the soft magnetic underlying layer 2 of the magnetic recording medium according to the present invention preferably has a stacked structure that includes a soft magnetic layer (lower SUL) close to the non-magnetic substrate, an exchange coupling control layer, and a soft magnetic layer (upper SUL) close to the magnetic recording layer. However, the soft magnetic underlying layer 2 of the magnetic recording medium according to the present invention may have a single-layer structure.

The soft magnetic underlying layer 2 on a side close to an outer circumference 8B (disc outer circumference portion) of the magnetic recording medium 6 has a higher characteristic frequency than the soft magnetic underlying layer 2 on a side close to an inner circumference 8A (disc inner circumference portion) of the magnetic recording medium 6. Further, relative permeability at high frequencies used in the disc outer circumference portion is higher in the soft magnetic underlying layer 2 in the disc outer circumference portion than in the soft magnetic underlying layer 2 in the disc inner circumference portion. The soft magnetic underlying layer 2 in the disc inner circumference portion has higher relative permeability at frequencies used in the disc inner circumference portion than the soft magnetic underlying layer 2 in the disc outer circumference portion. Here, under a magnetic field having the frequency of 300 MHz, the soft magnetic underlying layer 2 in the disc inner circumference portion preferably have higher relative permeability than the soft magnetic underlying layer 2 in the disc outer circumference portion. The reference frequency used in the disc inner circumference portion is not limited to 300 MHz. The frequencies used in the disc inner circumference portion are in the range of 100 MHz to 700 MHz, and preferably in the range of 200 MHz to 500 MHz.

Further, the soft magnetic underlying layer in the disc outer circumference portion preferably has relative permeability of 140 or higher under a magnetic field having the frequency of 900 MHz. The reference frequency used in the disc outer circumference portion is not limited to 900 MHz.

In the present specification, the "side close to the inner circumference 8A (disc inner circumference portion)" means a predetermined range that includes a recording region in the innermost circumference and extends from the center of the magnetic recording medium 6 toward the outer circumference. The "side close to the outer circumference 8B (disc outer circumference portion)" means a predetermined range that includes a recording region in the outermost circumference and extends toward the inner circumference. The present invention is not limited to this, and the disc inner circumference portion and the disc outer circumference portion may be present in that order from the center of the magnetic recording medium 6 toward the disc outer circumference.

Since the soft magnetic underlying layer in the disc outer circumference portion has a higher characteristic frequency than the soft magnetic underlying layer in the disc inner circumference portion, it is possible to satisfy the SNR characteristics required for recording high-frequency signals in the disc outer circumference portion.

Moreover, the soft magnetic underlying layer 2 in the disc inner circumference portion has higher relative permeability than the soft magnetic underlying layer 2 in the disc outer circumference portion. As described above, the EWAC characteristics are characteristics which represent a decrease in the output due to writing of signals having low frequencies (long periods) to adjacent tracks and which do not rarely matter when recording high-frequency (short period) signals. In particular, the EWAC characteristics mainly matter in a frequency range smaller than 300 MHz. Increasing the relative permeability in a range (that is, the disc inner circumference portion) where signals having frequencies lower than 300 MHz are written is effective in improving the EWAC characteristics. With an improvement in the relative permeability of the soft magnetic underlying layer 2 in the disc inner circumference portion, it is possible to decrease a track pitch (a distance between adjacent tracks) in the disc inner circumference portion and to improve the recording density of the magnetic recording medium. As a result, it is possible to provide a magnetic recording medium having a high recording capacity per piece.

With the trade-off between the characteristic frequency and the relative permeability, the soft magnetic underlying layer 2 in the disc inner circumference portion has a lower characteristic frequency than the soft magnetic underlying layer 2 in the disc outer circumference portion. However, as described above, since signals having lower frequencies than the disc outer circumference portion are recorded in the disc inner circumference portion, it is thought that the SNR characteristics are satisfied in the soft magnetic underlying layer 2 having a low characteristic frequency.

As described above, in the present invention, the soft magnetic underlying layer 2 satisfies such relationship that the relative permeability in the disc inner circumference portion is higher than that of the disc outer circumference portion, and the characteristic frequency in the disc inner circumference portion is lower than that of the disc outer circumference portion. Due to this, it is possible to obtain optimal EWAC characteristics as well as to satisfy the SNR characteristics in the regions ranging from the inner circumference to the outer circumference and in particular to decrease the track pitch in the disc inner circumference portion. Therefore, it is possible to provide a magnetic recording medium having a large recording capacity per piece.

The soft magnetic underlying layer 2 may be divided into the two regions described above. When the radius of a recording region in the innermost circumference from the center of the disc is $R_{ID}$ and the radius of a recording region in the outermost circumference is $R_{OD}$, a range of regions of which the radius position ranges from $R_{ID}$ to $(R_{ID}+R_{OD})/2$ may be defined as a disc inner circumference portion and a range of regions of which the radius position ranges from $(R_{ID}+R_{OD})/2$ to $R_{OD}$ may be defined as a disc outer circumference portion. The boundary between the disc inner circumference portion and the disc outer circumference portion may vary within the range of ±25% (that is, a radius ranging from $(R_{ID}+R_{OD})/4$ to $3(R_{ID}+R_{OD})/4$).

The soft magnetic underlying layer may be divided into three or more regions so that the characteristic frequency of the relative permeability of the soft magnetic underlying layer increases intermittently or stepwise as it goes from a region in the disc inner circumference portion to a region in the disc outer circumference portion and that the relative permeability of the soft magnetic underlying layer increases intermittently or stepwise as it goes from a region in the disc outer circumference portion to a region in the disc inner circumference portion. The expression "intermittently" in the present specification is used to represent a state where the composition of the soft magnetic underlying layer is substantially constant in the respective regions but is different between the regions. When the soft magnetic underlying layer according to the present invention is divided into three or more regions, an innermost circumference region (that is, a region closest to the inner circumference 8A of the magnetic recording medium) is referred to as a "disc inner circumference portion," and an outermost circumference region (that is, a region closest to the outer circumference 8B of the magnetic recording medium) is referred to as a "disc outer circumference portion."

Alternatively, the characteristic frequency of the relative permeability of the soft magnetic underlying layer may continuously increase as it goes from the disc inner circumference to the disc outer circumference, and the relative permeability may continuously increase as it goes from the disc outer circumference to the disc inner circumference.

Next, the material of the magnetic recording medium according to the present invention will be described.

The non-magnetic substrate 1 has a disc shape having a hole at the center. As the non-magnetic substrate 1, a NiP-plated Al alloy substrate, a glass substrate, a crystallized glass substrate, or a Si substrate used in general magnetic recording media can be used.

The soft magnetic underlying layer 2 is a layer for controlling the magnetic flux from a magnetic head to improve read/write characteristics similarly to the current perpendicular recording systems. Although an optimal value of an entire thickness of the soft magnetic underlying layer 2 changes depending on the structure and characteristics of the magnetic head used for magnetic recording, the thickness is preferably between 10 nm and 100 nm in view of productivity when the soft magnetic underlying layer is formed continuously with other layers.

The soft magnetic underlying layer 2 may have an anti-ferromagnetic coupling (AFC) structure that includes two soft magnetic layers. The AFC structure includes a lower SUL, an exchange coupling control layer, and an upper SUL, in which the lower SUL and the upper SUL are magnetically coupled in an anti-parallel relation with respect to an in-plane direction of the medium with the exchange coupling control layer interposed. However, the structure of the soft magnetic underlying layer 2 is not limited to the AFC structure but may be a single-layer structure.

In the soft magnetic underlying layer 2 of the magnetic recording medium according to the present invention, the material of the lower and upper SULs in an AFC structure or the material of the soft magnetic underlying layer 2 having a single-layer structure is preferably a combination of a ferromagnetic material having magnetic properties and an added material. The ferromagnetic material that can be used in the present invention includes an iron-based transitional metal or the like. In particular, in the present invention, a ferromagnetic material containing Fe, Co, Ni, and the like is preferable, and a ferromagnetic material containing Fe and Co is particularly preferable. The added material contains at least one element selected from the group consisting of B, C, Ti, Zr, Hf, V, Nb, Cr, and Ta. The added material may contain only one element and may contain a combination of two or more elements.

The soft magnetic underlying layer 2 in the disc outer circumference portion preferably contain an added material in a higher proportion than the soft magnetic underlying layer 2 in the disc inner circumference portion. Due to this, the soft magnetic underlying layer 2 in the disc outer circumference portion has a lower relative permeability and a higher characteristic frequency than the soft magnetic underlying layer 2 in the disc inner circumference portion. Conversely, the soft magnetic underlying layer 2 in the disc inner circumference portion has a lower characteristic frequency of the relative permeability than the soft magnetic underlying layer 2 in the disc outer circumference portion and has a higher relative permeability than the soft magnetic underlying layer 2 in the disc outer circumference portion. With such a structure of the soft magnetic underlying layer 2 as described above, it is possible to provide a magnetic recording medium capable of satisfying the requirements for the SNR and EWAC characteristics in regions ranging from the inner circumference to the outer circumference and coping with high recording capacity.

The soft magnetic underlying layer 2 may have such a composition, for example, that a proportion of the added material to the ferromagnetic material changes gradually as it goes from the inner circumference to the outer circumference. By changing the proportion of the added material in this manner, the degree of freedom of setting the number of allocated regions in which signals of the same frequency are recorded and setting a region switching position can be increased. The proportion of the added material may change intermittently or continuously.

The thickness of the soft magnetic underlying layer 2 may be the same over the entire region in view of the read/write characteristics or may be different as it goes from the inner circumference side to the outer circumference side. For example, when signals are recorded using the same recording head current over the entire regions extending from the inner circumference to the outer circumference and the above-described material is used, magnetization saturation is likely to occur in the inner circumference-side soft magnetic underlying layer 2 having high relative permeability. In particular, when the thickness of the soft magnetic underlying layer 2 is decreased, magnetization saturation is likely to occur in the inner circumference-side soft magnetic underlying layer 2. In such a case, it is preferable to increase the thickness of the inner circumference-side soft magnetic underlying layer 2. The expression "magnetization saturation" means a phenomenon that magnetization saturates without increasing with an increase in an external magnetic field.

The soft magnetic underlying layer 2 in the disc outer circumference portion needs to have a higher characteristic frequency than the soft magnetic underlying layer in the disc inner circumference portion. A recording frequency is determined based on a recording capacity of a magnetic recording medium. When recording density is 1 Tbits/in$^2$, a recording frequency of approximately 300 MHz is often used in the disc inner circumference portion and a recording frequency of approximately 1000 MHz is often used in the disc outer circumference portion. Thus, in the present invention, the characteristic frequency of the relative permeability is preferably 300 MHz or higher for the soft magnetic underlying layer 2 in the disc inner circumference portion and is 1000 MHz or higher for the soft magnetic underlying layer 2 in the disc outer circumference portion. For example, a material that has a characteristic frequency of 1000 MHz or higher contains a ferromagnetic material (FeCo) in 82 vol % or less. For example, the soft magnetic underlying layer 2 in the disc outer circumference portion can be formed using the material described in examples, containing a ferromagnetic material in the above-described content range. An example of such a material includes a material that contains 80 vol % ($Fe_{70}Co_{30}$)-15 vol % Ta-5 vol % B. In the present specification, the expression "80 vol % ($Fe_7Co_{30}$)-15 vol % Ta-5 vol % B" means that $Fe_{70}Co_{30}$, Ta (tantalum), and B (boron) are present in the proportion of 80:15:5 in terms of volume percent density, and the expression "$Fe_{70}Co_{30}$" means that Fe and Co are present in the proportion of 70:30 in terms of atomic percent density. In the following description of the present specification, expressions as above are used when compositions are represented.

Further, in the present invention, under a magnetic field having the frequencies (for example, 300 MHz) used for recording and evaluating characteristics in the disc inner circumference portion, the soft magnetic underlying layer 2 in the disc inner circumference portion preferably has higher relative permeability than the soft magnetic underlying layer 2 in the disc outer circumference portion. In the present invention, under the magnetic field having the frequency of 300 MHz, the soft magnetic underlying layer 2 in the disc inner circumference portion preferably has a relative permeability of 280 or higher and more preferably 700 or higher. The relative permeability under a magnetic field having high frequencies is preferably 140 or higher for the soft magnetic underlying layer 2 in the disc outer circumference portion. The "high frequencies" mean frequencies used for recording and evaluating characteristics in the disc outer circumference portion and can be set to 900 MHz, for example. However, the high frequencies are not limited to 900 MHz.

For example, a material having relative permeability of 700 or higher under the magnetic field having the frequency of 300 MHz preferably contains a ferromagnetic material (FeCo) in 82.5 vol % or more. For example, the soft magnetic underlying layer in the disc inner circumference portion can be formed using the material described in examples, containing a ferromagnetic material in the above-described content range. An example of such a material includes a material that contains 82.5 vol % ($Fe_{70}Co_{30}$)-13.5 vol % Ta-4 vol % B.

A plurality of regions can be formed in the soft magnetic underlying layer 2 so as to be arranged in order from the disc inner circumference portion to the disc outer circumference portion as described above as below. Soft magnetic underlying layer sputtering targets corresponding to the positions of the respective regions, the types of materials, and the like are prepared and the non-magnetic substrate 1 is placed on a predetermined position, and sputtering is performed. When the soft magnetic underlying layer 2 has a plurality of intermittent or stepwise regions, a partition plate or the like may be used so that grains of the adjacent targets do not interfere. On the other hand, when the soft magnetic underlying layer 2 is formed from a material of which the composition continuously changes, a desired soft magnetic underlying layer 2 can be formed by appropriately setting film forming conditions and the distance between targets and the substrate without attaching a partition plate. However, a method of forming the soft magnetic underlying layer 2 having a composition that changes in regions ranging from the disc inner circumference portion to the disc outer circumference portion is not limited to this.

A material of the exchange coupling control layer preferably rarely diffuses into the soft magnetic layer (upper and lower SULs). The exchange coupling control layer can be formed using Pt, Pd, Ru, and the like, for example, and is particularly preferably formed using Ru. The exchange coupling control layer has such a thickness that appropriate antiferromagnetic coupling is formed between the lower SUL and the upper SUL. Preferably, the exchange coupling control layer has a thickness in the range of 0.1 nm to 5 nm.

The underlayer 3 is a layer for controlling a crystal grain diameter and crystal orientation of the magnetic recording layer 4. Thus, the material of the underlayer 3 needs to be selected appropriately according to the material of the magnetic recording layer 4. For example, when the magnetic recording layer 4 positioned immediately above the underlayer 3 is formed of a material containing Co having a hexagonal closest packing (hcp) structure as it main component, the underlayer 3 is preferably formed of a material selected from crystalline materials having the same hcp structure or a face-centered cubic (fcc) structure. Specific examples of the underlayer 3 includes Ru, Re, Rh, Pt, Pd, Ir, Ni, or Co, or alloys thereof. The smaller the thickness of the underlayer 3, the more the recording performance of the magnetic recording medium is improved. However, when the function of controlling the crystal grain diameter and the crystal orientation of the magnetic recording layer 4 is taken into consideration, the underlayer 3 needs to have a certain extent of thickness. In the present invention, the underlayer 3 preferably has a thickness in the range of 3 nm to 30 nm. The underlayer 3 may have such a structure (granular structure) that crystal grains of the above-described material are separated by the grain boundary formed of an oxide or a nitride of Si, Cr, Co, Ti, or Ta.

The magnetic recording layer 4 preferably contains a crystalline magnetic material. The material of the magnetic recording layer 4 preferably includes a ferromagnetic alloy material that contains Co and Pt. The easy axis of magnetization of the ferromagnetic material needs to be oriented in the direction where magnetic recording is performed. For example, in order to perform perpendicular magnetic recording, the easy axis (for example, the c-axis of the hcp structure) of magnetization of the material of the magnetic recording layer 4 needs to be oriented in a direction perpendicular to the surface (main plane of the non-magnetic substrate 1) of the magnetic recording medium.

Alternatively, the magnetic recording layer 4 may have such a structure (granular structure) that magnetic crystal grains are separated by a non-magnetic material. In this case, the magnetic crystal grains are preferably formed of a material that mainly contains a magnetic element such as Co, Fe, or Ni. Moreover, the magnetic crystal grains preferably have a columnar shape having a diameter of several nm. Specifically, the magnetic crystal grains are preferably formed of a material in which metal such as Cr, B, Ta, or W is added to a CoPt alloy. On the other hand, the non-magnetic material preferably has a thickness of an approximately sub-nanometer order between adjacent magnetic crystal grains. The non-magnetic material preferably contains an oxide or a nitride of Si, Cr, Co, Ti, or Ta.

The magnetic recording layer 4 is formed using an optional method known in the conventional art. For example, a magnetron sputtering method can be used. In the present invention, the magnetic recording layer 4 used preferably has such a granular structure that crystal growth is realized so that magnetic crystal grains epitaxially grow on the crystal grains of the underlayer 3 and the non-magnetic material is positioned on the grain boundary of the underlayer 3.

In the present invention, the magnetic recording layer 4 has the same thickness as the magnetic recording medium of the conventional art. Preferably, the magnetic recording layer 4 has a thickness in the range of 5 nm to 20 nm.

The protective layer 5 can be formed of an optional material that is known in the conventional art such as a material that contains carbon as its main component. Specifically, the protective layer 5 can be formed using carbon, nitrogen-containing carbon, hydrogen-containing carbon, or the like. The protective layer 5 may have a single-layer structure or a stacked structure. For example, a stacked film including two carbon films having different properties and materials, a stacked film including a metal film and a carbon film, or a stacked film including an oxide film and a carbon film can be used as the protective layer 5. Typically, the protective layer 5 preferably has a thickness of 10 nm or smaller.

Although not illustrated in FIG. 1, a lubricating layer may be formed on the protective layer 5. The lubricating layer performs the role of preventing frictional wear of the magnetic recording medium by being disposed between a magnetic head and the magnetic recording medium when the magnetic head slides on the magnetic recording medium. Preferably, the lubricating layer can be formed using a fluorine-based lubricant. For example, the lubricating layer can be formed using an organic material or the like represented by $HO-CH_2-CF_2-(CF_2-O)_m-(C_2F_4-O)_n-CF_2-CH_2-OH$ (where n+m is approximately 40). The lubricating layer preferably has such a thickness that the lubricating layer can perform its function by taking the properties of the protective layer into consideration.

The respective layers stacked on the non-magnetic substrate 1 can be formed by various film forming techniques that are generally used in the field of magnetic recording media. The respective layers excluding the lubricating layer can be formed, for example, using a DC magnetron sputtering method, a vacuum deposition method, a chemical vapor deposition (CVD) method, and the like. Moreover, the lubricating layer can be formed, for example, using a dipping method and a spin coating method.

EXAMPLES

The perpendicular magnetic recording medium according to the present invention will be described in detail based on examples. These examples are representative examples for suitably describing the perpendicular magnetic recording medium of the present invention, and the present invention is not limited to these examples.

Manufacturing Example

In order to evaluate the relative permeability of a soft magnetic underlying layer and the characteristic frequency of relative permeability, samples were manufactured by forming a soft magnetic layer having a thickness of 40 nm and a carbon layer having a thickness of 3 nm as a protective layer on a ring-shaped chemically strengthened glass substrate with a smooth surface (N-10 glass substrate produced by HOYA Corporation). Targets for a soft magnetic layer corresponding to the soft magnetic underlying layer were created by combining a ferromagnetic material formed from an alloy of Fe and Co and an added material appropriately selected from the group consisting of B, C, Ti, Zr, Hf, V, Nb, and Ta. Subsequently, the soft magnetic layer was formed in an Ar gas atmosphere having a vacuum degree of 1.0 Pa using an in-line film forming according to a DC magnetron sputtering method that uses the targets. The carbon layer was formed according to a CVD method. The manufactured samples are illustrated in Table 1.

Figure 4A:
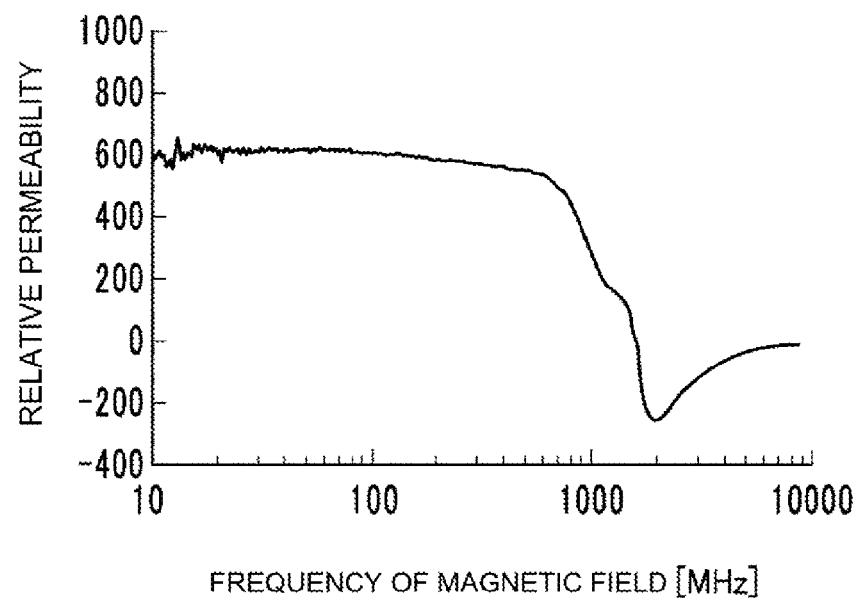
FIG. 4A is a graph illustrating the frequency dependence of relative permeability of material 6.
Figure 4B:
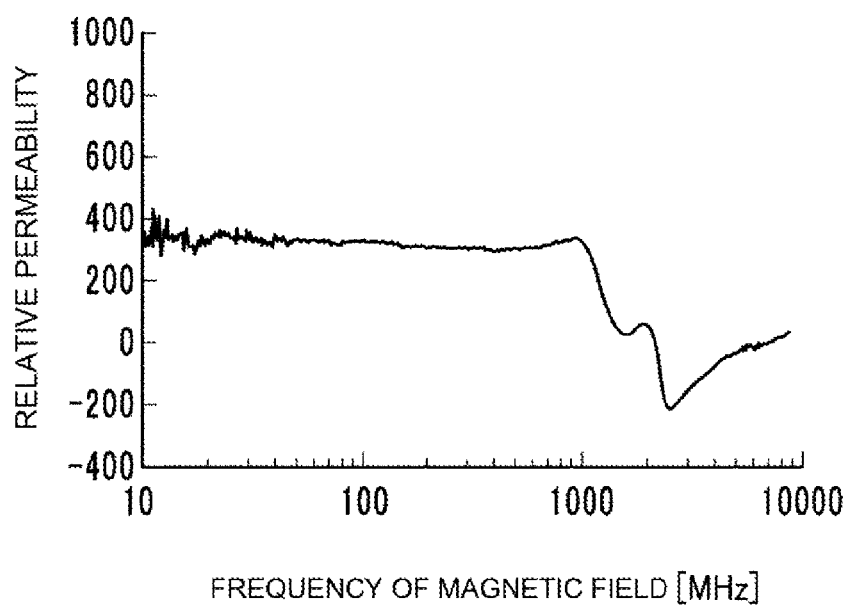
FIG. 4B is a graph illustrating the frequency dependence of relative permeability of material 7.
Figure 4C:
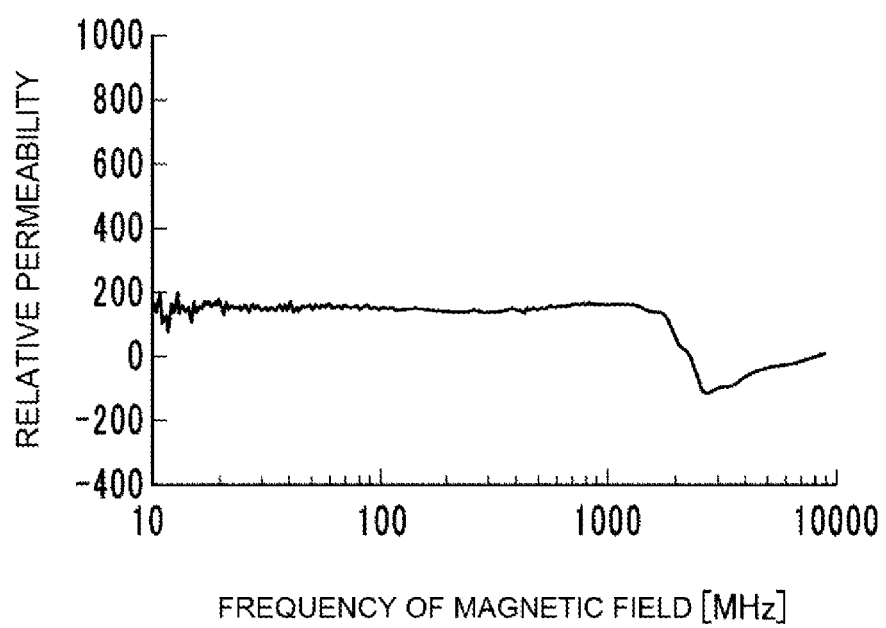
FIG. 4C is a graph illustrating the frequency dependence of relative permeability of material 8.

The relative permeability of the obtained samples and the characteristic frequency of the relative permeability will be described. The relative permeability, the frequency dependence of relative permeability, and the characteristic frequency of relative permeability were obtained by measuring the complex permeability under a magnetic field having frequencies in the range of 1 MHz to 9 GHz using PMM-9G1 (product of Ryowa Electronics Co., Ltd.). The complex permeability has a real part $\mu'$ and an imaginary part $\mu''$. In the present invention, the relative permeability was obtained as the ratio of the real part $\mu'$ of the complex permeability to the space permeability $\mu_0$. Moreover, the characteristic frequency of relative permeability was obtained based on the obtained relative permeability. Measurement examples of the frequency dependence of relative permeability are illustrated in FIGS. 4A to 4C. FIG. 4A illustrates the measurement results of material 6 having a composition of 82 vol % ($Fe_{70}Co_{30}$)-14 vol % Ta-4 vol % B, FIG. 4B illustrates the measurement results of material 7 having a composition of 81 vol % ($Fe_{70}Co_{30}$)-14 vol % Ta-5 vol % B, and FIG. 4C illustrates the measurement results of material 8 having a composition of 80 vol % ($Fe_{70}Co_{30}$-15 vol % Ta-4 vol % B.

The compositions of the soft magnetic layers of the respective samples, and the relative permeability and the characteristic frequencies of relative permeability under a magnetic field having the frequencies of 10 MHz (reference frequency for determining the characteristic frequency), 300 MHz (representative frequency necessary in the disc inner circumference portion), and 900 MHz (representative frequency necessary in the disc outer circumference portion) are illustrated in Table 1. Here, the characteristic frequency of relative permeability was obtained as a frequency at which the relative permeability became ½ of the value at the reference frequency 10 MHz.

netic material (FeCo) is preferable as the soft magnetic underlying layer in the disc outer circumference portion.

Example 1

In Example 1, as illustrated in FIG. 1, a FeCo-based soft magnetic underlying layer 2, an underlayer 3 formed from Ru, a CoCrPt—$SiO_2$ granular magnetic recording layer 4, a protective layer 5 formed from carbon (C), and a lubricating layer (not illustrated) were formed on a non-magnetic substrate 1, whereby a magnetic recording medium 6 was manufactured.

<Manufacturing of Soft Magnetic Underlying Layer Forming Target>

A sintered target having different compositions in the disc inner circumference portion and the disc outer circumference portion was used as a target for forming the soft magnetic underlying layer 2. The target was manufactured in the following order. First, particulate powder of $Fe_{70}Co_{30}$, Ta, and B was prepared. Subsequently, $Fe_{70}Co_{30}$ powder, Ta powder, and B powder were mixed using a ball mill so a composition ratio of 84 vol % ($Fe_{70}Co_{30}$)-13 vol % Ta-3 vol % B was obtained. The obtained mixture was filled in a mold having a

TABLE 1

Evaluation of relative permeability of soft magnetic layer and characteristic frequency of relative permeability

| Material | \multicolumn{9}{c}{Composition of soft magnetic layer (vol %)} | \multicolumn{3}{c}{Relative permeability} | Characteristic frequency of relative permeability (MHz) |
|---|---|---|---|---|---|---|---|---|---|---|---|---|---|
| | $Fe_{70}Co_{30}$ | Ta | B | Zr | Ti | Nb | C | V | Hf | @10 MHz | @300 MHz | @900 MHz | |
| 1 | 87 | 10 | 3 | | | | | | | 1600 | 0 | 0 | 25 |
| 2 | 85 | 12 | 3 | | | | | | | 1200 | 0 | 0 | 100 |
| 3 | 84 | 13 | 3 | | | | | | | 1050 | 525 | 0 | 300 |
| 4 | 83 | 13 | 4 | | | | | | | 900 | 800 | 0 | 600 |
| 5 | 82.5 | 13.5 | 4 | | | | | | | 700 | 700 | 130 | 800 |
| 6 | 82 | 14 | 4 | | | | | | | 600 | 600 | 400 | 1000 |
| 7 | 81 | 14 | 5 | | | | | | | 350 | 350 | 340 | 1200 |
| 8 | 80 | 15 | 5 | | | | | | | 150 | 150 | 150 | 2000 |
| 9 | 78 | 16 | 6 | | | | | | | 100 | 100 | 100 | 3000 |
| 10 | 84 | 4 | | 5 | 7 | | | | | 950 | 300 | 0 | 200 |
| 11 | 83 | 12 | | | | 5 | | | | 870 | 860 | 0 | 580 |
| 12 | 84 | 4 | | 4 | 8 | | | | | 1000 | 600 | 0 | 310 |
| 13 | 84 | | | | 16 | | | | | 1100 | 280 | 0 | 150 |
| 14 | 83 | 5 | | 5 | 7 | | | | | 850 | 845 | 0 | 620 |
| 15 | 80 | 5 | | 5 | 10 | | | | | 140 | 140 | 140 | 2200 |
| 16 | 81 | 5 | 5 | | 9 | | | | | 340 | 340 | 335 | 1200 |
| 17 | 82 | 5 | 5 | | | | | 8 | | 580 | 580 | 350 | 1000 |
| 18 | 80 | | | | 12 | | | | 2 | 140 | 140 | 140 | 2300 |
| 19 | 80 | 5 | 5 | | 10 | | | | | 160 | 160 | 160 | 1900 |

From the results of Table 1, in the soft magnetic layer (materials 1 to 9) including a ferromagnetic material (FeCo) and an added material of B and Ta, it was found that the relative permeability and the characteristic frequency of relative permeability at 10 MHz are in a trade-off relationship, and the higher the relative permeability of the soft magnetic layer, the lower the characteristic frequency of relative permeability.

Moreover, it was found that the larger the proportion of the ferromagnetic material (FeCo), the higher the relative permeability at 10 MHz and the lower the characteristic frequency. Thus, it was found that a material containing a larger amount of the ferromagnetic material (FeCo) is preferable as the soft magnetic underlying layer in the disc inner circumference portion. On the other hand, the smaller the amount of the ferromagnetic material (FeCo), the higher the characteristic frequency of relative permeability. Therefore, it was found that a material containing a smaller amount of the ferromagdiameter $\phi$ of 44 mm and was sintered using a hot plate with a pressure of 2 ton/$cm^2$ (approximately 196 MPa) in a vacuum atmosphere. Further, the upper and lower surfaces of the sintered body were machined and ground to obtain a disc-shaped target material for the disc inner circumference portion, having an outer diameter $\phi$ of 44 mm and a thickness of 10 mm.

Moreover, $Fe_{70}Co_{30}$ powder, Ta powder, and B powder were mixed using a ball mill in the above-described manner so a composition ratio of 80 vol % ($Fe_{70}Co_{30}$)-15 vol % Ta-5 vol % B was obtained. The obtained mixture was filled in a mold having an outer diameter $\phi$ of 75 mm and a central shaft having a diameter $\phi$ of 44 mm and was sintered using a hot plate with a pressure of 2 ton/$cm^2$ (approximately 196 MPa) in a vacuum atmosphere. Further, the upper and lower surfaces of the sintered body were machined and ground to obtain a ring-shaped target material for the disc outer circumference portion, having an outer diameter $\phi$ of 75 mm, an inner diameter $\phi$ of 75 mm, and a thickness of 10 mm.

Subsequently, the target material for the disc outer circumference portion, having the outer diameter φ of 75 mm and the inner diameter φ of 44 mm was embedded in the outer circumference of the target material for the disc inner circumference portion, having the diameter φ of 44 mm and was set on a mold having a diameter φ of 75 mm and was sintered. Further, the upper and lower surfaces of the sintered body was machined and ground to obtain a disc-shaped two-component target material having an outer diameter φ of 75 mm and a thickness of 8 mm.

Finally, the obtained two-component target material was attached to a backing plate of copper having an outer diameter φ of 95 mm and a thickness of 5 mm to obtain a target for forming the soft magnetic underlying layer 2.

<Manufacturing of Magnetic Recording Medium>

A ring-shaped chemically strengthened glass substrate with a smooth surface (N-10 glass substrate produced by HOYA Corporation) was used as the non-magnetic substrate 1. This glass substrate has a disc shape having a hole at the center and has the dimensions of a general 2.5-inch disc having an outer diameter φ of 65 mm, an inner diameter φ of 20 mm, and a thickness of 0.635 mm. First, the non-magnetic substrate 1 was washed and loaded into a film forming apparatus. These films ranging from the soft magnetic underlying layer 2 to the protective layer 5 were formed in an in-line film forming apparatus without being exposed to the atmosphere.

Figure 5:
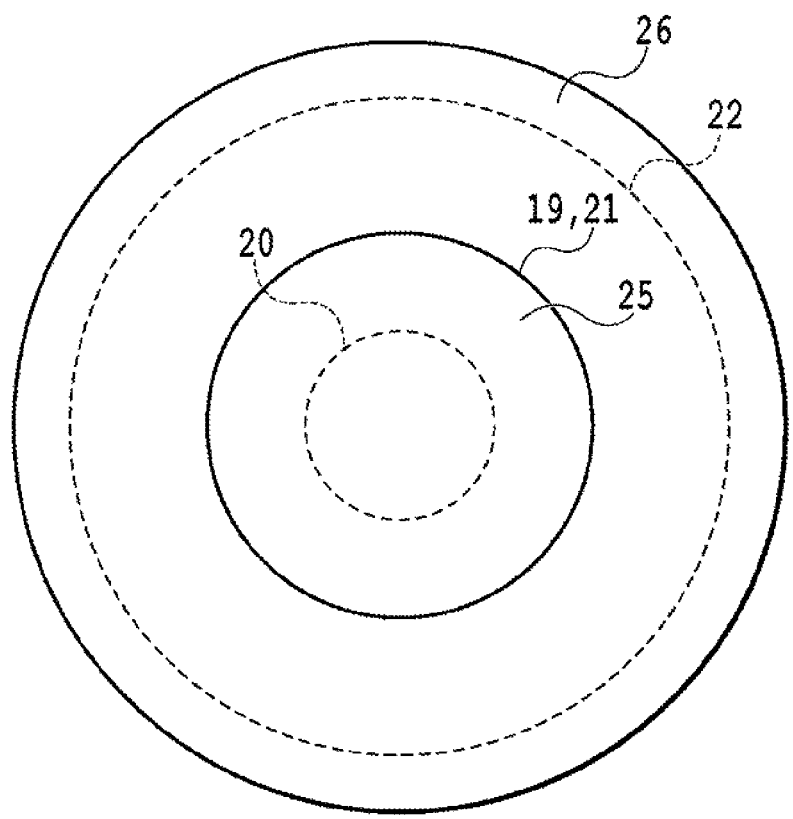
FIG. 5 is a schematic plan view illustrating an arrangement of a target and a non-magnetic substrate when a soft magnetic underlying layer according to the present invention is formed.
Figure 6:
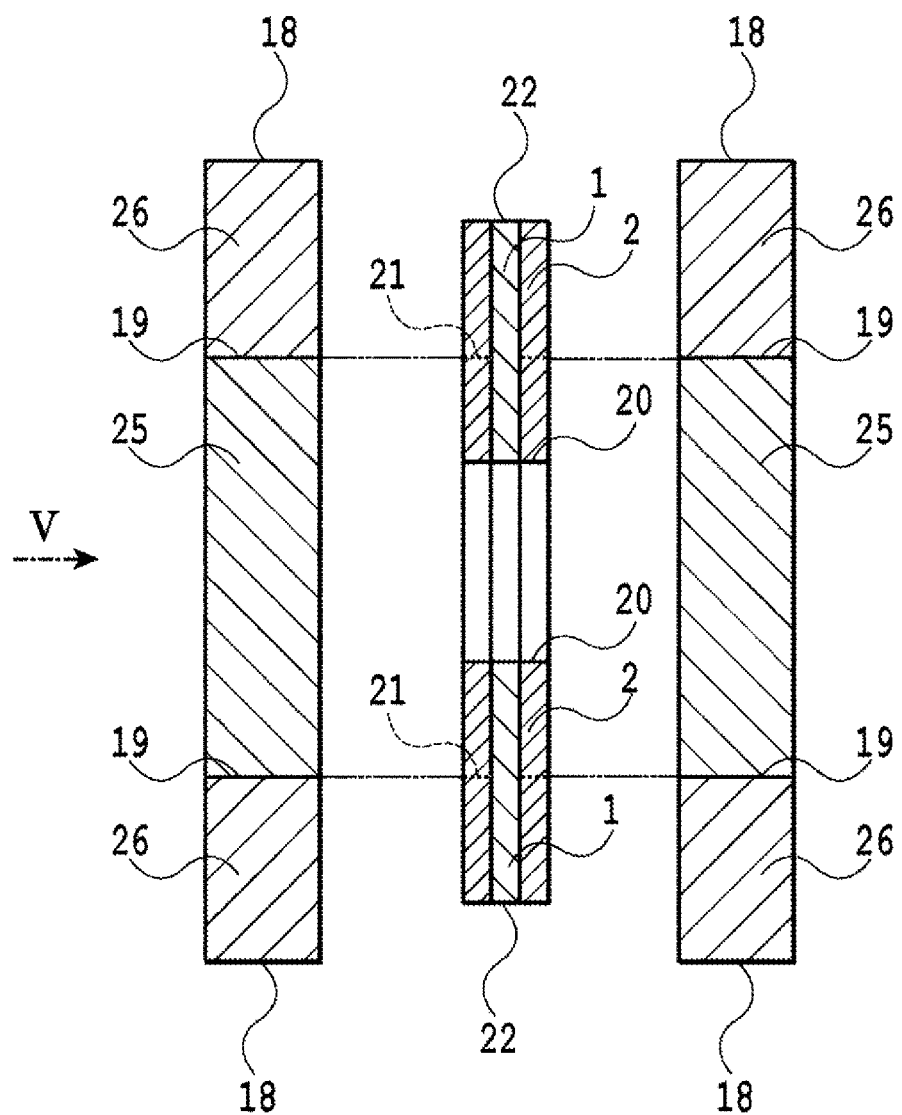
FIG. 6 is a schematic cross-sectional view illustrating an arrangement of a target and a non-magnetic substrate when a soft magnetic underlying layer according to the present invention is formed.

Subsequently, the soft magnetic underlying layer 2 having an AFC structure including a lower SUL, an exchange coupling control layer, and an upper SUL was formed. First, a lower SUL having a thickness of 18 nm was formed in an Ar gas atmosphere having a vacuum degree of 1.0 Pa using a DC magnetron sputtering method that uses the target for forming the soft magnetic underlying layer 2. Subsequently, an exchange coupling control layer formed from Ru and having a thickness of 0.5 nm was formed on the entire surface of the lower SUL in an Ar gas atmosphere having a vacuum degree of 0.5 Pa according to a DC magnetron sputtering method. Subsequently, an upper SUL having a thickness of 22 nm was formed in an Ar gas atmosphere having a vacuum degree of 1.0 Pa according to a DC magnetron sputtering method that uses the target for forming the soft magnetic underlying layer 2. When the upper and lower SULs were formed, the center of the target and the center of the non-magnetic substrate 1 were disposed on the same axis as illustrated in FIGS. 5 and 6. In addition, interference between the compositions of the disc inner circumference portion and the disc outer circumference portion was prevented using a partition plate. FIG. 5 is a schematic plan view illustrating an arrangement of the target and the non-magnetic substrate 1 when seen from the direction indicated by V in FIG. 6, and FIG. 6 is a schematic cross-sectional view illustrating the arrangement of the target and the non-magnetic substrate 1. Here, a soft magnetic layer (lower and upper SULs) having a composition ratio of 84 vol % ($Fe_{70}Co_{30}$)-13 vol % Ta-3 vol % B was formed in the disc inner circumference portion ranging from the inner circumference 20 of the non-magnetic substrate 1 to a boundary 21. On the other hand, a soft magnetic layer (lower and upper SULs) having a composition ratio of 80 vol % ($Fe_{70}Co_{30}$)-15 vol % Ta-5 vol % B was formed in the disc outer circumference portion ranging from the boundary 21 to the outer circumference 22 of the non-magnetic substrate 1. The outer circumference 18 of the target material 26 for the disc outer circumference portion was positioned on the outer side than the outer circumference 22 of the non-magnetic substrate 1. Moreover, the boundary 21 is a circumference (a circumference having a radius of 22 mm from the center of the non-magnetic substrate 1) at a distance of 12 mm from the inner circumference of the non-magnetic substrate 1 and is positioned at a position corresponding to a boundary 19 between the target 25 for the disc inner circumference portion and the target 26 for the disc outer circumference portion.

Subsequently, the underlayer 3 formed from Ru and having a thickness of 20 nm was formed in an Ar gas atmosphere having a vacuum degree of 1.5 Pa according to a DC magnetron sputtering method.

Subsequently, the magnetic recording layer 4 formed from 91 vol % ($Co_{75}Cr_{15}Pt_{10}$)-9 vol % ($SiO_2$) and having a thickness of 15 nm was formed in an Ar gas atmosphere having a vacuum degree of 1.0 Pa according to a DC magnetron sputtering method.

Subsequently, the protective layer 5 made from carbon and having a thickness of 3 nm was formed according to a CVD method. After that, a stacked structure in which the respective layers were formed was unloaded from the in-line film forming apparatus.

Finally, a lubricant (Moresco Phosfarol A-20H produced by MORESCO Corporation) made from perfluoropolyether was applied according to a dipping method to form a lubricating layer having a thickness of 2 nm, and the magnetic recording medium 6 was obtained.

Example 2

Using targets for the disc inner circumference-side soft magnetic underlying layer and the disc outer circumference-side soft magnetic underlying layer, in which the volume proportions of $Fe_{70}Co_{30}$ which is a ferromagnetic material and Ta and B which are added materials were changed, the magnetic recording media of Examples 2-1 to 2-19 were manufactured. Here, in the magnetic recording media of Examples 2-1 to 2-19, the thicknesses of the lower and upper SULs were appropriately changed so that the product of a total thickness of the soft magnetic underlying layer and the saturation magnetization (Bs) is the same. The thickness of the exchange coupling control layer was fixed to 0.5 nm, and the ratio of the thickness of the lower SUL to the upper SUL was fixed to 1:1. The other conditions were the same as those of Example 1. The compositions of the disc inner circumference-side soft magnetic underlying layer and the disc outer circumference-side soft magnetic underlying layer of the manufactured samples, the relative permeability under a magnetic field having the frequency of 300 MHz, and the characteristic frequency of relative permeability are illustrated in Table 2. The magnetic recording media were manufactured so that the composition of the soft magnetic layer of the samples is expressed as (100-x-y) vol % ($Fe_{70}Co_{30}$)-x vol % Ta-y vol % B.

Example 3

For the disc inner circumference-side soft magnetic underlying layer and the disc outer circumference-side soft magnetic underlying layer, using targets which combined ferromagnetic material $Fe_{70}Co_{30}$ and an added material appropriately selected from the group consisting of B, C, Ti, Zr, Hf, V, Nb, and Ta, the magnetic recording media of Examples 3-1 to 3-5 were manufactured. Here, in the magnetic recording media of Examples 3-1 to 3-5, the thicknesses of the lower and upper SULs were appropriately changed so that the product of a total thickness of the soft magnetic underlying layer and the saturation magnetization (Bs) is the same. The thickness of the exchange coupling control layer was fixed to 0.5 nm and the ratio of the thickness of the lower SUL to the upper SUL was fixed to 1:1. The other conditions were the same as those of Example 1. The compositions of the disc inner circumference-side soft magnetic underlying layer and the disc outer circumference-side soft magnetic underlying layer of the manufactured samples, the relative permeability under a magnetic field having the frequency of 300 MHz, and the characteristic frequency of relative permeability are illustrated in Table 3.

(Evaluation)

The SNR and EWAC characteristics of the magnetic recording media manufactured according to Examples 1, 2 and 3 were evaluated.

The SNR and EWAC characteristics were measured using a spin-stand tester to which a commercially available GMR head is attached. The GMR head used had a writing track width of 65 nm and a reading track width of 56 nm.

A signal of which the frequency was changed so that linear recording density is constant at respective radius positions was recorded, and the ratio of the signal output to the noise output during reading was measured to obtain SNR. In this evaluation, the SNR was measured in the disc inner circumference portion (radius position, R=12.5 mm) and the disc outer circumference portion (radius position, R=31.5 mm). A signal having the frequency 300 MHz was used in the disc inner circumference portion. A signal having the frequency 756 MHz was used in the disc outer circumference portion.

A case where SNR is 10 dB or higher was evaluated as Good (B), and a case where SNR is lower than 10 dB was evaluated as Poor (E). The evaluation results are illustrated in Tables 2 and 3.

The EWAC characteristics were measured by recording a signal 1 of a first frequency on one track, recording a signal 2 of a second frequency different from the first frequency 100 times on both side tracks adjacent to the track, and reading the signal recorded initially. The measurement was performed while changing the track pitch, and a track pitch at which the output of the signal 1 disappeared after the signal 2 was recorded on the adjacent tracks was obtained as an EWAC value. The first signal was recorded while changing the first frequency so that the linear recording density became constant at the respective radius positions. Specifically, the first frequency was set to 40 MHz in the disc inner circumference portion (radius value R=12.5 mm), and the first frequency was set to 101 MHz in the disc outer circumference portion (radius value R=31.5 mm). Moreover, when a signal was recorded on the adjacent tracks, the second signal was recorded while changing the second frequency so that the linear recording density became constant at the respective radius positions. Specifically, the second frequency was set to 80 MHz in the disc inner circumference portion (radius value R=12.5 mm), and the second frequency was set to 202 MHz in the disc outer circumference portion (radius value R=31.5 mm).

Here, from the perspective of securing recording capacity per piece, the EWAC characteristics in the disc inner circumference portion were evaluated as Excellent (A) when the EWAC value was smaller than 85 nm, Good (B) when the EWAC value was 85 nm or more and smaller than 90 nm, Equal (C) to the conventional art when the EWAC value was 90 nm or more and smaller than 95 nm, and Poor (E) when the EWAC value was 95 nm or more. The EWAC characteristics in the disc inner circumference portion were evaluated as Good (B) when the EWAC value was smaller than 100 nm, Equal (C) to the conventional art when the EWAC value was 100 nm or more and smaller than 105 nm, and Poor (E) when the EWAC value was 105 nm or more. The evaluation results are illustrated in Tables 2 and 3.

An evaluation sample was manufactured separately for each of the magnetic recording media of Examples 1, 2, and 3, and the composition of the soft magnetic underlying layer was evaluated according to fluorescent X-ray analysis.

A sample was manufactured as the evaluation sample by forming a soft magnetic layer having a thickness of 300 nm and a carbon layer having a thickness of 3 nm as a protective layer on a ring-shaped chemically strengthened glass substrate having a smooth surface (N-10 glass substrate produced by HOYA Corporation). The soft magnetic layer corresponding to the soft magnetic underlying layer was formed by an in-line film forming apparatus similarly to Examples 1 to 3 using the same target as that used in the respective samples of Examples 1 to 3. The soft magnetic layer was formed in an Ar gas atmosphere having a vacuum degree of 1.0 Pa according to a DC magnetron sputtering method.

Fluorescent X-ray analysis was performed at positions of the disc inner circumference portion (radius value R=12.5 mm) and the disc outer circumference portion (radius value R=31.5 mm) of the respective evaluation samples manufactured. The measurement results were calibrated according to a calibration curve obtained in advance using existing materials, and composition ratios of respective elements were obtained. In both the disc inner circumference portion and the disc outer circumference portion, measurement was performed at eight positions shifted by an angle of 45° from the center and the average of the measurement results was obtained. As a result, it was found that the soft magnetic layer formed had the same composition as the composition of the target in both the disc inner circumference portion and the disc outer circumference portion. The compositions described in Tables 2 and 3 are the compositions of the target.

TABLE 2

Evaluation of magnetic recording medium that uses $Fe_{70}Co_{30}$—Ta—B soft magnetic underlying layer

| | | Disc inner circumference-side soft magnetic underlying layer*[1] | | Disc outer circumference-side soft magnetic underlying layer *[3] | | EWAC | | SNR | |
|---|---|---|---|---|---|---|---|---|---|
| Examples | Composition*[3] | Relative permeability*[4], Characteristic frequency*[5] | Composition*[3] | | Relative permeability*[4], Characteristic frequency*[5] | Inner circumference*[1] | Outer circumference*[2] | Inner circumference*[1] | Outer circumference*[2] |
| 1 | Material 3 $84\%Fe_{70}Co_{30}$—$13\%Ta$—$3\%B$ | 525 300 | Material 8 $80\%Fe_{70}Co_{30}$—$15\%Ta$—$5\%B$ | | 150 2000 | B | B | B | B |
| 2-1 | Material 4 $83\%Fe_{70}Co_{30}$—$13\%Ta$—$4\%B$ | 800 600 | Material 6 $82\%Fe_{70}Co_{30}$—$14\%Ta$—$4\%B$ | | 600 1000 | A | B | B | B |

TABLE 2-continued

Evaluation of magnetic recording medium that uses $Fe_{70}Co_{30}$—Ta—B soft magnetic underlying layer

| Examples | Disc inner circumference-side soft magnetic underlying layer[*1] Composition[*3] | Relative permeability[*4], Characteristic frequency[*5] | Disc outer circumference-side soft magnetic underlying layer[*3] Composition[*3] | Relative permeability[*4], Characteristic frequency[*5] | EWAC Inner circumference[*1] | EWAC Outer circumference[*2] | SNR Inner circumference[*1] | SNR Outer circumference[*2] |
|---|---|---|---|---|---|---|---|---|
| 2-2 | Material 5 84%$Fe_{70}Co_{30}$—13%Ta—3%B | 700 800 | Material 5 84%$Fe_{70}Co_{30}$—13%Ta—3%B | 700 800 | B | B | B | E |
| 2-3 | Material 6 82%$Fe_{70}Co_{30}$—14%Ta—4%B | 600 1000 | Material 4 83%$Fe_{70}Co_{30}$—13%Ta—4%B | 800 600 | B | B | B | E |
| 2-4 | Material 4 83%$Fe_{70}Co_{30}$—13%Ta—4%B | 800 600 | Material 8 80%$Fe_{70}Co_{30}$—15%Ta—5%B | 150 2000 | A | B | B | B |
| 2-5 | Material 7 81%$Fe_{70}Co_{30}$—14%Ta—5%B | 350 1200 | Material 8 80%$Fe_{70}Co_{30}$—15%Ta—5%B | 150 2000 | B | B | B | B |
| 2-6 | Material 8 80%$Fe_{70}Co_{30}$—15%Ta—5%B | 150 2000 | Material 8 80%$Fe_{70}Co_{30}$—15%Ta—5%B | 150 2000 | C | B | B | B |
| 2-7 | Material 9 78%$Fe_{70}Co_{30}$—16%Ta—6%B | 100 3000 | Material 8 80%$Fe_{70}Co_{30}$—15%Ta—5%B | 150 2000 | C | B | B | B |
| 2-8 | Material 6 82%$Fe_{70}Co_{30}$—14%Ta—4%B | 600 1000 | Material 3 84%$Fe_{70}Co_{30}$—13%Ta—3%B | 525 300 | B | B | B | E |
| 2-9 | Material 3 84%$Fe_{70}Co_{30}$—13%Ta—3%B | 525 300 | Material 3 84%$Fe_{70}Co_{30}$—13%Ta—3%B | 525 300 | B | B | B | E |
| 2-10 | Material 2 85%$Fe_{70}Co_{30}$—12%Ta—3%B | 0 100 | Material 3 84%$Fe_{70}Co_{30}$—13%Ta—3%B | 525 300 | B | B | E | E |
| 2-11 | Material 1 87%$Fe_{70}Co_{30}$—10%Ta—3%B | 0 25 | Material 3 84%$Fe_{70}Co_{30}$—13%Ta—3%B | 525 300 | B | B | E | E |
| 2-12 | Material 3 84%$Fe_{70}Co_{30}$—13%Ta—3%B | 525 300 | Material 8 80%$Fe_{70}Co_{30}$—15%Ta—5%B | 150 2000 | B | B | B | B |
| 2-13 | Material 3 84%$Fe_{70}Co_{30}$—13%Ta—3%B | 525 300 | Material 6 82%$Fe_{70}Co_{30}$—14%Ta—4%B | 600 1000 | B | B | B | B |
| 2-14 | Material 3 84%$Fe_{70}Co_{30}$—13%Ta—3%B | 525 300 | Material 3 84%$Fe_{70}Co_{30}$—13%Ta—3%B | 525 300 | B | B | B | E |
| 2-15 | Material 3 84%$Fe_{70}Co_{30}$—13%Ta—3%B | 525 300 | Material 1 87%$Fe_{70}Co_{30}$—10%Ta—3%B | 0 25 | B | B | B | E |
| 2-16 | Material 8 80%$Fe_{70}Co_{30}$—15%Ta—5%B | 150 2000 | Material 3 84%$Fe_{70}Co_{30}$—13%Ta—3%B | 525 300 | C | B | B | E |
| 2-17 | Material 8 80%$Fe_{70}Co_{30}$—15%Ta—5%B | 150 2000 | Material 4 83%$Fe_{70}Co_{30}$—13%Ta—4%B | 800 600 | C | B | B | E |
| 2-18 | Material 8 80%$Fe_{70}Co_{30}$—15%Ta—5%B | 150 2000 | Material 7 81%$Fe_{70}Co_{30}$—14%Ta—5%B | 350 1200 | C | B | B | B |
| 2-19 | Material 8 80%$Fe_{70}Co_{30}$—15%Ta—5%B | 150 2000 | Material 8 80%$Fe_{70}Co_{30}$—15%Ta—5%B | 150 2000 | C | B | B | B |

[*1]Measurement position, R = 12.5 mm
[*2]% is vol %
[*3]Measurement position, R = 31.5 mm
[*4]value at 300 MHz
[*5]units are MHz

TABLE 3

Evaluation of magnetic recording medium including soft magnetic underlying layer that uses various added materials

| | Disc inner circumference-side soft magnetic underlying layer*1 | | Disc outer circumference-side soft magnetic underlying layer*3 | | EWAC | | SNR | |
|---|---|---|---|---|---|---|---|---|
| Examples | Composition*3 | Relative permeability*4, Characteristic frequency*5 | Composition*3 | Relative permeability*4, Characteristic frequency*5 | Inner circumference*1 | Outer circumference*2 | Inner circumference*1 | Outer circumference*2 |
| 3-1 | Material 10 84%$Fe_{70}Co_{30}$—5%Zr—4%Ta—7%Nb | 300 200 | Material 15 80%$Fe_{70}Co_{30}$—5%Zr—5%Ta—10%Nb | 140 2200 | B | B | B | B |
| 3-2 | Material 11 83%$Fe_{70}Co_{30}$—12%Ta—5%C | 860 580 | Material 16 81%$Fe_{70}Co_{30}$—5%Zr—5%Ta—9%CNb | 340 1200 | A | B | B | B |
| 3-3 | Material 12 84%$Fe_{70}Co_{30}$—4%Zr—4%Ta—8%Ti | 600 310 | Material 17 82%$Fe_{70}Co_{30}$—5%Zr—5%Ta—8%V | 580 1000 | B | B | B | B |
| 3-4 | Material 13 84%$Fe_{70}Co_{30}$—16%Ti | 280 150 | Material 18 80%$Fe_{70}Co_{30}$—12%Ta—6%B—2%Hf | 140? 2300? | B | B | B | B |
| 3-5 | Material 14 83%$Fe_{70}Co_{30}$—5%Zr—5%Ta—7%Ti | 845 620 | Material 19 80%$Fe_{70}Co_{30}$—5%Zr—5%Ta—10%Ti | 160 1900 | B | B | B | B |

*1Measurement position, R = 12.5 mm
*2% is vol %
*3Measurement position, R = 31.5 mm
*4value at 300 MHz
*5units are MHz From comparison between Example 1 and Examples 2-1 to 2-3, in a case where two types of soft magnetic underlying layers including a ferromagnetic material containing FeCo and an added material containing B and Ta are combined, when the proportion of the ferromagnetic material ($Fe_{70}Co_{30}$) of the soft magnetic underlying layer in the disc inner circumference portion is higher than the proportion of the ferromagnetic material ($Fe_{70}Co_{30}$) of the soft magnetic underlying layer in the disc outer circumference portion, it was possible to realize a magnetic recording medium that satisfies the SNR while maintaining the EWAC characteristics.

In Examples 2-4 to 2-7, the soft magnetic underlying layer in the disc outer circumference portion was fixed to material 8 containing 80 vol % ($Fe_{70}Co_{30}$)-15 vol % Ta-5 vol % B, and the proportion of the ferromagnetic material ($Fe_{70}Co_{30}$) of the soft magnetic underlying layer in the disc inner circumference portion was changed from 83 vol % to 78 vol %. In all Examples 2-4 to 2-7, although the SNR in the disc inner circumference portion and the disc outer circumference portion was maintained in the range of Good "B," if the proportion of the ferromagnetic material ($Fe_{70}Co_{30}$) of the soft magnetic underlying layer in the disc inner circumference portion became 80 vol % or lower, the EWAC characteristics were slightly deteriorated and deviated from the range of Good "B" in the disc inner circumference portion.

In Examples 2-8 to 2-11, the composition of the soft magnetic underlying layer in the disc outer circumference portion was fixed to material 3 containing 84 vol % (FeCo)-12 vol % Ta-3 vol % B, and the proportion of the ferromagnetic material ($Fe_{70}Co_{30}$) of the soft magnetic underlying layer in the disc inner circumference portion was changed from 82 vol % to 87 vol %. The results showed that in the entire disc outer circumference portion, the EWAC characteristics were Good "B" and the SNR was Poor "E." Moreover, when the proportion of the ferromagnetic material ($Fe_{70}Co_{30}$) in the disc inner circumference portion was 84 vol % or lower, both the EWAC characteristics and SNR were Good "B." When the proportion of the ferromagnetic material ($Fe_{70}Co_{30}$) was higher than 84 vol %, the EWAC characteristics were maintained to Good "B" but the SNR was Poor "E."

In Examples 2-12 to 2-15, the soft magnetic underlying layer in the disc inner circumference portion was fixed to material 3 containing 84 vol % ($Fe_{70}Co_{30}$)-13 vol % Ta-3 vol % B, and the proportion of the ferromagnetic material ($Fe_{70}Co_{30}$) of the soft magnetic underlying layer in the disc outer circumference portion was changed from 80 vol % to 87 vol %. In all Examples 2-12 to 2-15, the EWAC characteristics were Good "B" in both the disc inner circumference portion and the disc outer circumference portion. However, when the proportion of the ferromagnetic material ($Fe_{70}Co_{30}$) of the soft magnetic underlying layer in the disc outer circumference portion became 84 vol % or higher, the SNR deviates from the range of Good "B."

In Examples 2-16 to 2-19, the soft magnetic underlying layer in the disc inner circumference portion was fixed to material 8 containing 80 vol % ($Fe_{70}Co_{30}$)-15 vol % Ta-5 vol % B, and the proportion of the ferromagnetic material ($Fe_{70}Co_{30}$) of the soft magnetic underlying layer in the disc outer circumference portion was changed from 84 vol % to 80 vol %. When the proportion of the ferromagnetic material ($Fe_{70}Co_{30}$) of the soft magnetic underlying layer in the disc outer circumference portion was 83 vol % or higher (Examples 2-16 and 2-17), the EWAC characteristics were Good "B" and the SNR deviated from the range of Good "B." Moreover, when the proportion of the ferromagnetic material ($Fe_{70}Co_{30}$) of the soft magnetic underlying layer in the disc inner circumference portion was 81 vol % or lower, the SNR was Good "B" and the EWAC characteristics were Equal "C" to the conventional art.

From the results of Examples 1 and 2, a magnetic recording medium satisfying both EWAC characteristics and SNR in the disc inner circumference portion and the disc outer circumference portion was a magnetic recording medium in which the proportion of the ferromagnetic material ($Fe_{70}Co_{30}$) of the soft magnetic underlying layer in the disc inner circumference portion is in the range of 81 vol % and 84 vol %, the proportion of the ferromagnetic material ($Fe_{70}Co_{30}$) of the soft magnetic underlying layer in the disc outer circumference portion is in the range of 80 vol % to 82 vol %, and the proportion of the ferromagnetic material ($Fe_{70}Co_{30}$) of the soft magnetic underlying layer in the disc inner circumference portion is higher than the proportion of the ferromagnetic material ($Fe_{70}Co_{30}$) of the soft magnetic underlying layer in the disc outer circumference portion.

From the results of Examples 3-1 to 3-5 of Table 2, it was found that a material in which the ferromagnetic material ($Fe_{70}Co_{30}$) and an added material that contains an element of B, C, Ti, Zr, Hf, V, Nb, or Ta or a combination thereof are combined is preferable as a material of the soft magnetic underlying layer of the magnetic recording medium of the present invention. Among these combinations, when the proportion of the ferromagnetic material ($Fe_{70}Co_{30}$) of the soft magnetic underlying layer in the disc inner circumference portion is higher than the proportion of the ferromagnetic material ($Fe_{70}Co_{30}$) of the soft magnetic underlying layer in the disc outer circumference portion, it was possible to realize a magnetic recording medium having excellent EWAC and SNR characteristics.

As described above, from the results of Manufacturing Example and Examples 1 to 3, it was found that it is necessary to dispose a proper material as the soft magnetic underlying layer in order to satisfy both the EWAC and SNR characteristics. Specifically, it is necessary to satisfy the following conditions:

(1) The characteristic frequency of the soft magnetic underlying layer in the disc outer circumference portion is higher than the characteristic frequency of the soft magnetic underlying layer in the disc inner circumference portion; and (2) In the frequencies of a recording magnetic field used in the disc inner circumference portion, the relative permeability of the soft magnetic underlying layer in the disc inner circumference portion is higher than the relative permeability of the soft magnetic underlying layer in the disc outer circumference portion.

Preferably, the characteristic frequency of the relative permeability of the soft magnetic underlying layer in the disc outer circumference portion is 1000 MHz or higher, the relative permeability of the soft magnetic underlying layer in the disc inner circumference portion under a magnetic field having a frequency of 300 MHz is 280 or higher, and the relative permeability of the soft magnetic underlying layer in the disc outer circumference portion under a magnetic field having a frequency of 900 MHz is 140 or higher. More preferably, the relative permeability of the soft magnetic underlying layer in the disc inner circumference portion under a magnetic field having a frequency of 300 MHz is 700 or higher.

As described above, with the configuration of the soft magnetic underlying layer of the present invention, it was possible to obtain a magnetic recording medium capable of satisfying the criteria for both EWAC and SNR characteristics.

In the present examples, although the target used for forming the soft magnetic underlying layer was formed in two regions of the disc inner circumference portion and the disc outer circumference portion, the same advantages were obtained even when the target was formed in three or more regions.

It will be apparent to those skilled in the art that various modifications and variations can be made to the disclosed magnetic recording medium. Other embodiments will be apparent to those skilled in the art from consideration of the specification and practice of the disclosed method and apparatus. It is intended that the specification and examples be considered as exemplary only, with a true scope being indicated by the following claims and their equivalents.

The invention claimed is:

1. A magnetic recording medium, comprising:
    a disc-shaped non-magnetic substrate having a hole disposed at a center of the disc-shaped non-magnetic substrate;
    a soft magnetic underlying layer; and
    a magnetic recording layer;
    wherein relative permeability of the soft magnetic underlying layer under a magnetic field having a frequency of between about 100 MHz and about 700 MHz increases gradually from a disc outer circumference to a disc inner circumference, and a characteristic frequency of the relative permeability increases gradually from the disc inner circumference to the disc outer circumference.

2. The magnetic recording medium according to claim 1, wherein:
    the soft magnetic underlying layer includes a plurality of regions arranged in order from the disc inner circumference to the disc outer circumference;
    the plurality of regions includes a disc inner circumference portion that is an innermost circumference region and a disc outer circumference portion that is an outermost circumference region;
    the characteristic frequency of the relative permeability increases stepwise from the disc inner circumference to the disc outer circumference; and
    the relative permeability increases stepwise from the disc outer circumference to the disc inner circumference.

3. The magnetic recording medium according to claim 2, wherein the soft magnetic underlying layer includes two regions in the disc inner circumference portion and the disc outer circumference portion.

4. The magnetic recording medium according to claim 2, wherein:
    the characteristic frequency of the relative permeability of the soft magnetic underlying layer in the disc outer circumference portion is 1000 MHz or higher;
    the relative permeability of the soft magnetic underlying layer in the disc inner circumference portion under a magnetic field having a frequency of 300 MHz is 280 or higher; and
    the relative permeability of the soft magnetic underlying layer in the disc outer circumference portion under a magnetic field having a frequency of 900 MHz is 140 or higher.

5. The magnetic recording medium according to claim 1, wherein:
    the soft magnetic underlying layer contains (i) a ferromagnetic material containing Fe and Co and (ii) an added material containing at least one element selected from the group consisting of B, C, Ti, Zr, Hf, V, Nb, and Ta; and
    a proportion of the ferromagnetic material increases gradually from the disc outer circumference to the disc inner circumference.

6. The magnetic recording medium according to claim 2, wherein:
    the soft magnetic underlying layer contains (i) a ferromagnetic material containing Fe and Co and (ii) an added material containing at least one element selected from the group consisting of B, C, Ti, Zr, Hf, V, Nb, and Ta; and
    a proportion of the ferromagnetic material increases stepwise from the disc outer circumference to the disc inner circumference.

7. The magnetic recording medium according to claim 6, wherein:

the soft magnetic underlying layer in the disc inner circumference portion contains a ferromagnetic material that is between 81 vol % and 84 vol % of a total volume of the ferromagnetic material and the added material; and the soft magnetic underlying layer in the disc outer circumference portion contains a ferromagnetic material that is between 80 vol % and 82 vol % of a total volume of the ferromagnetic material and the added material.

* * * * *